US012483474B2

(12) United States Patent
Uscumlic et al.

(10) Patent No.: US 12,483,474 B2
(45) Date of Patent: Nov. 25, 2025

(54) USER-AWARE VIRTUALIZATION FOR MICROSERVICES

(71) Applicant: Nokia Solutions and Networks Oy, Espoo (FI)

(72) Inventors: Bogdan Uscumlic, Orsay (FR); Andrea Enrici, Bourg la Reine (FR)

(73) Assignee: Nokia Solutions and Networks Oy, Espoo (FI)

( * ) Notice: Subject to any disclaimer, the term of this patent is extended or adjusted under 35 U.S.C. 154(b) by 41 days.

(21) Appl. No.: 18/400,582

(22) Filed: Dec. 29, 2023

(65) Prior Publication Data

US 2025/0219905 A1     Jul. 3, 2025

(51) Int. Cl.
*H04L 41/0826* (2022.01)
*H04L 41/0816* (2022.01)

(52) U.S. Cl.
CPC ...... *H04L 41/0826* (2013.01); *H04L 41/0816* (2013.01)

(58) Field of Classification Search
CPC .............. H04L 41/0826; H04L 41/0816
See application file for complete search history.

(56) References Cited

U.S. PATENT DOCUMENTS

| 2018/0278495 | A1* | 9/2018 | Di Cairano-Gilfedder ................ H04L 41/5096 |
| 2022/0014963 | A1* | 1/2022 | Yeh ........................ G06N 3/045 |
| 2022/0124560 | A1* | 4/2022 | Yeh .................... H04L 41/5025 |

* cited by examiner

*Primary Examiner* — June Sison
(74) *Attorney, Agent, or Firm* — Harness, Dickey & Pierce, P.L.C.

(57) ABSTRACT

A network function distributed to and implemented by data centers, using a service communication proxy, may not be suitable for performing functions utilizing user-aware needs. A method for distributing a network function utilizing user-aware needs includes receiving user-aware information, calculating a network configuration for a plurality of network functions based on the user-aware information, and transmitting the network configuration to at least one connectivity agent.

19 Claims, 7 Drawing Sheets

USER-AWARE VIRTUALIZATION FOR MICROSERVICES

TECHNICAL FIELD

One or more example embodiments relate to wireless communications networks.

BACKGROUND

Service communication proxy (SCP) enables programming of network functions (NFs) in the form of microservices such that the functional part of the microservice can be developed without considering the networking interconnections of the microservice. The networking interconnections are handled by "service agents" and their interconnection with network repository functions NRFs, within the SCP paradigm.

SUMMARY

The scope of protection sought for various example embodiments is set out by the independent claims. The example embodiments and/or features, if any, described in this specification that do not fall under the scope of the independent claims are to be interpreted as examples useful for understanding various embodiments.

At least one example embodiment provides a method including receiving user-aware information, calculating a network configuration for a plurality of network functions based on the user-aware information, and transmitting the network configuration to at least one connectivity agent.

The calculating the network configuration includes optimizing an objective function including a minimum total server use cost and a bandwidth use cost of microservices of the network functions.

The optimizing the objective function includes optimizing the objective function such that for each microservice demand of a plurality of microservice demands, a total bandwidth allocated to the respective microservice demand is equal to a requested traffic amplitude for the respective microservice demand.

The optimizing the objective function includes optimizing the objective function such that for each microservice demand of a plurality of microservice demands, for each candidate path corresponding to a respective microservice demand, and for each pair of links of a plurality of pairs of links belonging to a same path, all links on the same path carry a same microservice communication load.

The same microservice communication load is based on a virtualization topology, a microservice traffic demand, a route link, and a route path.

The same microservice communication load is equivalent to $x_l^{(d,v),r} = x_{l'}^{t((d,v),r)}$, where is is the microservice traffic demand, v is the virtualization topology, r is the route path, and l is the route link.

The optimizing the objective function includes optimizing the objective function such that for each node of a plurality of nodes, a total allocated CPU capacity is greater than or equal to a requested processing capacity of microservices at the respective node.

The optimizing the objective function includes optimizing the objective function such that for each link in the network, of a plurality of links in the network, a total bandwidth capacity does not exceed a total capacity of the respective link.

The optimizing the objective function includes optimizing the objective function such that for each microservice demand of a plurality of microservice demands only a single path is allocated to each respective microservice demand.

A sum of all path selection variables is less than or equal to 1.

The optimizing the objective function includes optimizing the objective function such that for each microservice demand of a plurality of microservice demands and for each candidate path corresponding to a respective microservice demand, a total bandwidth capacity of a traffic demand over the respective candidate path does not exceed a total link capacity of the respective candidate path.

The user-aware information includes a specific requirement for network function-to-network function communications of a user equipment.

According to at least one example embodiment, an apparatus includes at least one processor and at least one memory storing instructions that, when executed by the at least one processor, cause the apparatus to receive user-aware information, calculate a network configuration for a plurality of network functions based on the user-aware information, and transmit the network configuration to at least one connectivity agent.

The at least one processor is further configured to cause the apparatus to calculate the network configuration by optimizing an objective function including a minimum total server use cost and a bandwidth use cost of microservices of the network functions.

The at least one processor is further configured to cause the apparatus to optimize the objective function such that for each microservice demand of a plurality of microservice demands, a total bandwidth allocated to the respective microservice demand is equal to a requested traffic amplitude for the respective microservice demand.

The at least one processor is further configured to cause the apparatus to optimize the objective function such that for each microservice demand of a plurality of microservice demands, for each candidate path corresponding to a respective microservice demand, and for each pair of links of a plurality of pairs of links belonging to a same path, all links on the same path carry a same microservice communication load.

The at least one processor is further configured to cause the apparatus to optimize the objective function such that for each node of a plurality of nodes, a total allocated CPU capacity is greater than or equal to a requested processing capacity of microservices at the respective node.

The at least one processor is further configured to cause the apparatus to optimize the objective function such that for each link in the network, of a plurality of links in the network, a total bandwidth capacity does not exceed a total capacity of the respective link.

The at least one processor is further configured to cause the apparatus to optimize the objective function such that for each microservice demand of a plurality of microservice demands only a single path is allocated to each respective microservice demand.

The at least one processor is further configured to cause the apparatus to optimize the objective function such that for each microservice demand of a plurality of microservice demands and for each candidate path corresponding to a respective microservice demand, a total bandwidth capacity of a traffic demand over the respective candidate path does not exceed a total link capacity of the respective candidate path.

According to at least one example embodiment, a non-transitory computer-readable storage medium may store computer-readable instructions that, when executed, cause one or more processors to receive user-aware information, calculate a network configuration for a plurality of network functions based on the user-aware information, and transmit the network configuration to at least one connectivity agent.

According to at least one example embodiment, an apparatus includes a means for receiving user-aware information, a means for calculating a network configuration for a plurality of network functions based on the user-aware information, and a means for transmitting the network configuration to at least one connectivity agent.

According to at least one example embodiment, a method includes gathering user-aware information of a plurality of user equipments, transmitting the user-aware information to a controller, receiving a network configuration of a plurality of network functions from the controller, the network configuration based on the user-aware information, and configuring a network based on the network configuration.

According to at least one example embodiment, an apparatus includes at least one processor and at least one memory storing instructions that, when executed by the at least one processor, cause the apparatus to gather user-aware information of a plurality of user equipments, transmit the user-aware information to a controller, receive a network configuration of a plurality of network functions from the controller, the network configuration based on the user-aware information, and configure a network based on the network configuration.

According to at least one example embodiment, a non-transitory computer-readable storage medium may store computer-readable instructions that, when executed, cause one or more processors to gather user-aware information of a plurality of user equipments, transmit the user-aware information to a controller, receive a network configuration of a plurality of network functions from the controller, the network configuration based on the user-aware information, and configure a network based on the network configuration.

According to at least one example embodiment, an apparatus includes a means for gathering user-aware information of a plurality of user equipments, a means for transmitting the user-aware information to a controller, a means for receiving a network configuration of a plurality of network functions from the controller, the network configuration based on the user-aware information, and a means for configuring a network based on the network configuration.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of radio access network (RAN) or radio network elements (e.g., a gNB), user equipment (UE), or the like, it should be understood that one or more example embodiments discussed herein may be performed by the one or more processors (or processing circuitry) at the applicable device. For example, according to one or more example embodiments, at least one memory may include or store computer program code, and the at least one memory and the computer program code may be configured to, with at least one processor, cause a radio network element (or user equipment) to perform the operations discussed herein.

As discussed herein the terminology "one or more" and "at least one" may be used interchangeably.

As discussed herein, a gNB may also be referred to as a base station, access point, enhanced NodeB (eNodeB), or more generally, a radio access network element, radio network element, or network node. A UE may also be referred to herein as a mobile station, and may include a mobile phone, a cell phone, a smartphone, a handset, a personal digital assistant (PDA), a tablet, a laptop computer, a phablet, or the like.

It will be appreciated that a number of example embodiments may be used in combination.

Figure 6:
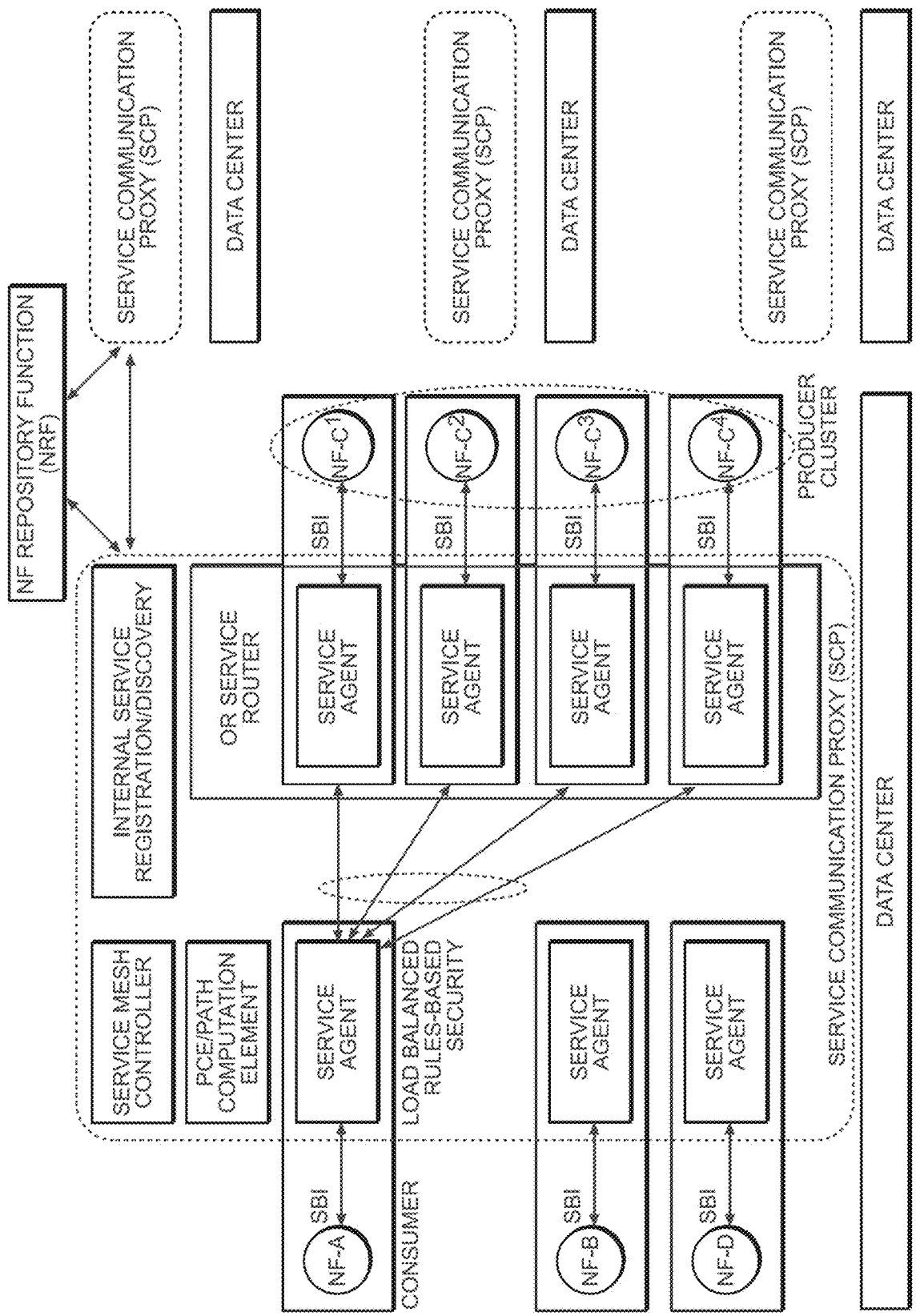
FIG. 6 is an illustration of an example system utilizing a service communication proxy (SCP).

FIG. 6 is an illustration of an example system utilizing a service communication proxy (SCP).

Service communication proxy (SCP) allows for "virtualization" of networking interconnections of different network functions. Due to this virtualization, the complexity of routing and transport may be abstracted from the network function (NF) functionality. A NF may include at least one microservice (e.g., one or more microservices). As used herein, the terms NF and microservice may be used interchangeably. For example, a NF may be distributed to and implemented by data centers, using a SCP, without modifying the NF for particular networking interconnections of the given data center.

However, the interconnection patterns needed for some NFs may include a greater complexity and/or may be highly evolutive. Conventionally, such NFs may not be supported by SCP.

Figure 7:
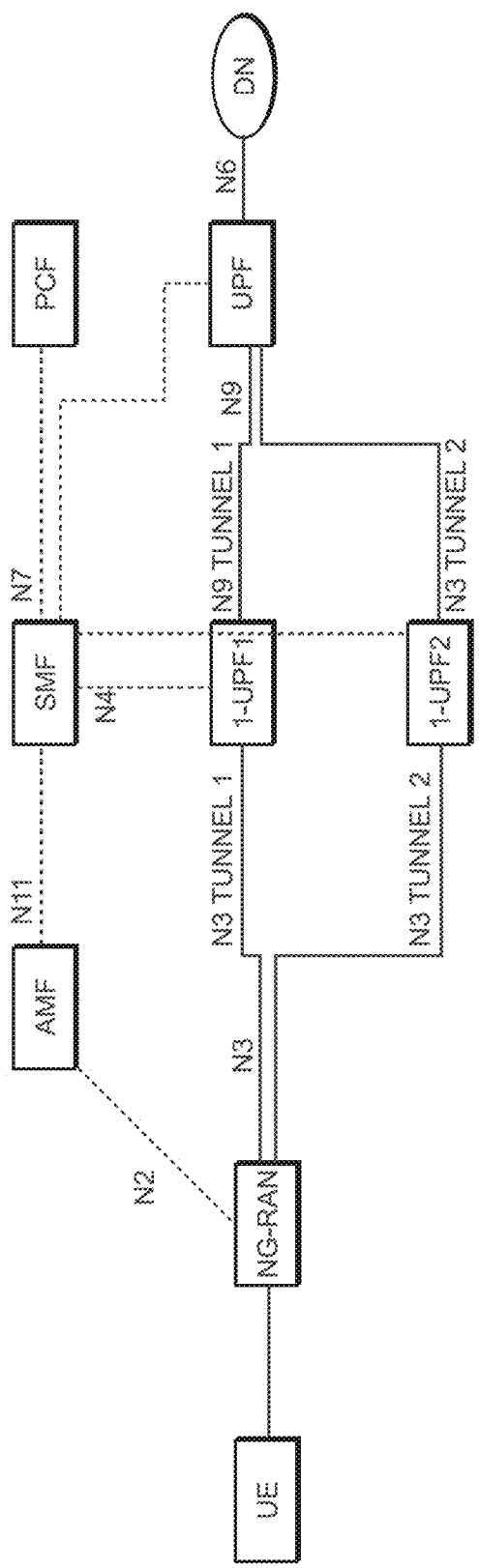
FIG. 7 illustrates a redundant path transmissions for some types of applications in 5G.

FIG. 7 illustrates a need for redundant path transmissions for some type of applications in 5G.

Referring to FIG. 7, some types of applications may require redundant path transmissions (e.g., over physically distant disjoint links). For example, some ultra reliable low latency communications (uRLLC) services, may provision multiple (e.g., two or more) intermediate user plane functions (IUPFs) for each gNB to increase reliability of the uRLLC. The provisioning of multiple IUPFs for each gNB may result in redundant path transmission. The redundant path transmission allows communications to continue even in case of failure of some elements or links in one of the paths. This type of redundancy is typical for transport networks, such as Intelligent Transportation Systems (ITS). However, it is not limited thereto and may be implemented in other 5G applications.

For highly mobile services, like (ITS) (e.g., connected vehicles), user-aware needs (e.g., geo-localization) of both gNB and UPFs need to be regularly updated. The mobile services may be updated by provisioning the resources of the data centers with SCP support that are close enough to the users of the service or to ensure a sufficient quality of service (QOS). As used herein, the terms user-aware needs, user-needs, and user-aware information may be used interchangeably. User-aware needs refer to any specific requirement/need, related to NF-to-NF communications of a UE. User-aware needs can evolve over time. User-aware needs are always related to UE needs since the NFs support at least one user application of a UE. User-aware needs may evolve over time due to, for example, changes in UE position, environment or network conditions, etc. Such changes may result in a need to optimize the NF-to-NF communication.

A NF distributed to data centers via SCP, as shown for example in FIG. 7, may not be suitable for performing NFs utilizing user-aware needs.

Similar to SCP allowing for virtualization of networking interconnections between NFs, example embodiments provide systems configured to virtualize the microservice connectivity of a subset of microservices (NFs in general), based on user-aware requirements. This user-aware virtualization can apply to all uRLLC-alike services (where redundancy of data plane, i.e., UPF, is required for the reliability), for seamless formation of multicast virtual domains between different micro-services, for virtualization and tenant isolation at a level lower than 5G/6G slicing, etc. Example embodiments may function in parallel with existing SCP systems.

Figure 1:
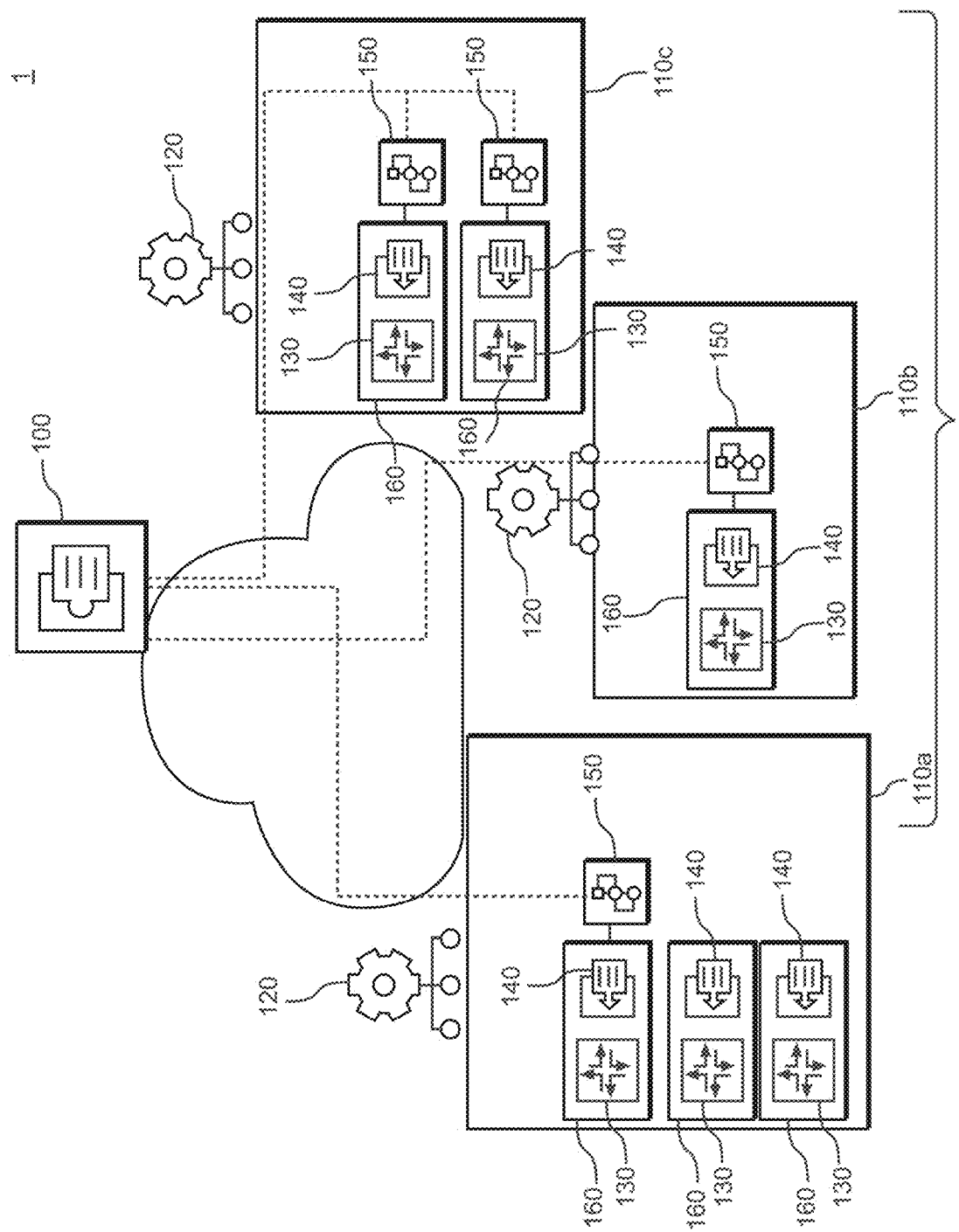
FIG. 1 illustrates an example of an architectural view of a system according to example embodiments.

FIG. 1 illustrates an example of an architectural view of a system according to example embodiments.

Referring to FIG. 1, a system according to example embodiments includes a user-aware virtualization controller (UAVC) 100, data centers 110, and service communication proxies (SCPs) 120.

System 1 shown in FIG. 1 includes three data centers 100 including a first data center 110a, a second data center 110b, and a third data center 110c. However, example embodiments are not limited thereto and the system 1 may include any number of data centers 100.

As shown in FIG. 1, each data center 110 includes a corresponding SCP 120. The SCPs 120 shown in FIG. 1 are illustrated as external to the data centers 110. However, example embodiments are not limited thereto. For example, a SCP 120 may be contained within and/or implemented by a respective data center 110. For example, the SCP 120 may be implemented by a processor 112 (described in more detail below with regard to FIG. 2B)) of a data center 110.

Each data center 110 includes at least one data server 160 including a plurality of network functions (NFs) 130 and/or a plurality of service agents 140, and/or a plurality of user-aware connectivity agents (UACA) 150.

Each of the NFs 130 may be implemented by the processor 112 (described in more detail below with regard to FIG. 2C). For example, a server 160 of a data center may implement one or more NF 130. Each server includes a service agent, implemented by the processor 112. A service agent may be part of an SCP implementation and may be allocated to a NF to facilitate execution of additional or peripheral tasks required for the NF. A service agent may perform various functions such as facilitating communication, load-balancing, cryptography, and/or security.

Each server of a data center may additionally include a UACA 150. The UACA 150 may be implemented by a data server 160. Alternatively, the UACA 150 may be a separate apparatus configured to communicate with the data server 160. For example, the UACA 150 may be implemented by processor 152 (described in more detail below with regard to FIG. 2A).

The UACA 150 may gather the information about user needs. For example, the UACA may receive user-aware information from a user (e.g., from a user equipment). The UACA 150 receives the user-aware information directly from the user (e.g., from the UE, via the service agent communicating with user's NF, by measuring the operational parameters of the NF (e.g., QoS performance parameters of NF, jitter and/or latency of packets that are dispatched) and/or by monitoring the status data of neighboring network components and links that have an impact on the NF's performance (e.g. contentions, packet losses, link failures, etc.). The UACA 150 may then then transmit the user-aware information to the UAVC 100.

A network administrator (manager) may deploy a UACA 150 at a given server 160 when configuring the server. For example, a network administrator may configure some servers at a data center 110 to include a UACA 150, and some servers at a data center 110 not to include a UACA 150. For example, data center 110a shown in FIG. 1 includes three servers 160 with only one of the three servers 160 having an associated UACA 150. Data center 110b includes one server 160 with an associated UACA 150 and data center 110c includes two servers 160 each having an associated UACA 150. However, example embodiments are not limited thereto and a data center 110 may include any number of servers 160 any number of which may be configured with a respective associated UACA 150. All NFs 130 implemented at a server 160 may benefit from advantages associated with a UACA 150 deployed at the server 160 (described in more detail later).

Figure 2A:
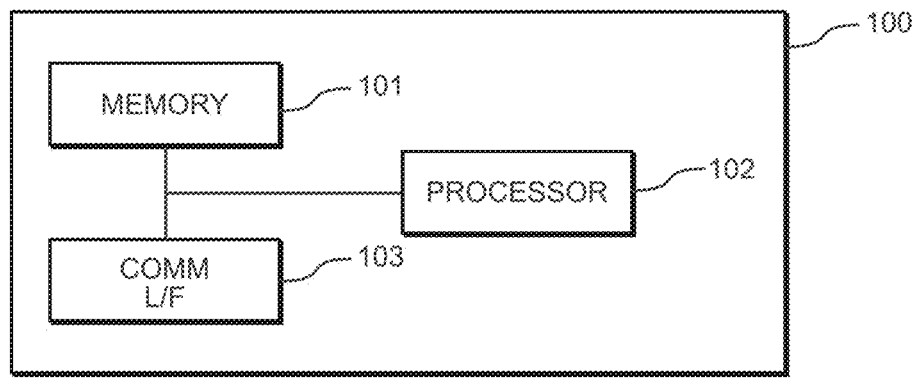
FIG. 2A is a block diagram illustrating an example embodiment of a user-aware virtualization controller according to example embodiments.

FIG. 2A is a block diagram illustrating an example embodiment of a user-aware virtualization controller according to example embodiments.

Referring to FIG. 2A, the UAVC 100 may include a memory 101, processing circuitry (such as at least one processor 102), and/or a communication interface 103. The memory 101 may include various special purpose program code including computer executable instructions which may cause the UAVC 100 to perform the one or more of the methods of the example embodiments. The communication interface may be a wired communication interface (e.g., ethernet) and/or a wireless communication interface (e.g., WiFi, 5G, a PC5 air interface, etc.).

In at least one example embodiment, the processing circuitry may include at least one processor (and/or processor cores, distributed processors, networked processors, etc.), such as the at least one processor 102, which may be configured to control one or more elements of the UAVC 100, and thereby cause the UAVC 100 to perform various operations. The processing circuitry (e.g., the at least one processor 102, etc.) is configured to execute processes by retrieving program code (e.g., computer readable instructions) and data from the memory 101 to process them, thereby executing special purpose control and functions of the entire UAVC 100. Once the special purpose program instructions are loaded into, (e.g., the at least one processor 102, etc.), the at least one processor 102 executes the special purpose program instructions, thereby transforming the at least one processor 102 into a special purpose processor.

In at least one example embodiment, the memory 101 may be a non-transitory computer-readable storage medium and may include a random access memory (RAM), a read only memory (ROM), and/or a permanent mass storage device such as a disk drive, or a solid state drive. Stored in the memory 101 is program code (i.e., computer readable instructions) related to operating the UAVC 100.

Figure 2B:
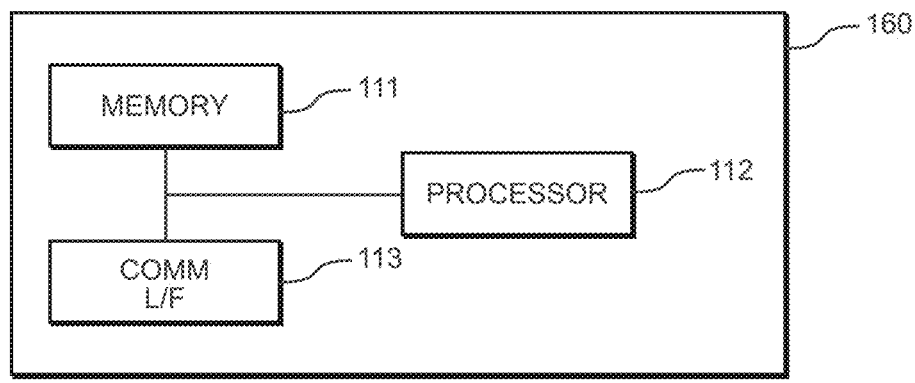
FIG. 2B is a block diagram illustrating an example embodiment of a data server according to example embodiments.

FIG. 2B is a block diagram illustrating an example embodiment of a data server 160 according to example embodiments.

Referring to FIG. 2B, the data server 160 may include a memory 111, processing circuitry (such as at least one processor 112), and/or a communication interface 113. The memory 111, the processor 112, and/or the communication interface 110 may be included in, for example, one or more data servers 160 located in the data center 110.

Descriptions of the memory 111, the processor 112, and the communication interface 113 may be substantially similar to the memory 101, the processor 102, and the communication interface 103, respectively, and are therefore omitted.

Figure 2C:
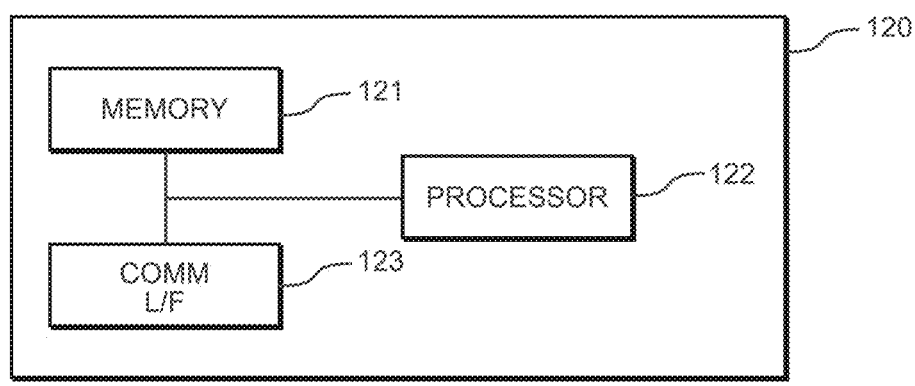
FIG. 2C is a block diagram illustrating an example embodiment of a service communication proxy according to example embodiments.

FIG. 2C is a block diagram illustrating an example embodiment of a service communication proxy according to example embodiments.

Referring to FIG. 2C, the service communication proxy (SCP) 120 may include a memory 121, processing circuitry (such as at least one processor 122), and/or a communication interface 123.

Descriptions of the memory 121, the processor 122, and the communication interface 123 may be substantially similar to the memory 101, the processor 102, and the communication interface 103, respectively, and are therefore omitted.

Figure 2D:
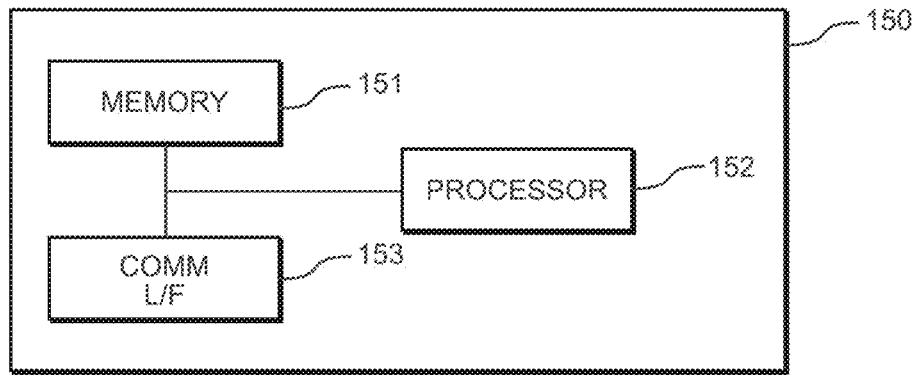
FIG. 2D is a block diagram illustrating an example embodiment of a user-aware connectivity agent according to example embodiments.

FIG. 2D is a block diagram illustrating an example embodiment of a user-aware connectivity agent according to example embodiments.

Referring to FIG. 2D, the UACA 150 may include a memory 151, processing circuitry (such as at least one processor 152), and/or a communication interface 153. In some example embodiments, the UACA 150 may be separate from the server 160. However, example embodiments are not limited thereto and the UACA may included in the data server 160. For example, the UACA 150 may be implemented by the processor 112.

Figure 3:
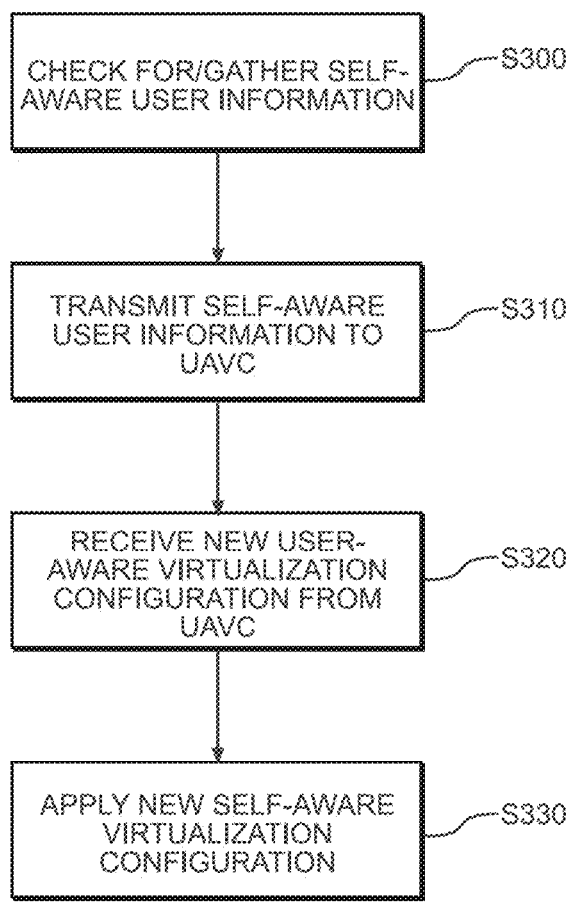
FIG. 3 is a flowchart illustrating a method according to example embodiments.

FIG. 3 is a flowchart illustrating a method according to example embodiments. The method shown in FIG. 3 may be performed at the UACA 150.

Referring to FIG. 3, at S300 the UACA 150 checks for and gathers user-aware information of the NFs 130. For example, the UACA 150 may check for user-aware information about NFs 130 implemented at a same server as the UACA 150. For example, the UACA may check for information about evolving service requirements or evolving service quality of the micro-service to which the UACA agent is connected. For example, the UACA 150 may receive the user-aware information directly from the user by measuring the operational parameters of the NF and/or by monitoring the status data of neighboring network components and links that have an impact on the NF's performance. For example, the UACA may check for information about evolving service requirements or evolving service quality of the micro-service to which the UACA agent is connected.

If user-aware information of the NFs 130 is available, also at S300 the UACA gathers the user-aware information as discussed above. The user-aware information may include user-aware information of a plurality of users of a given NF. For example, in a case where a user of a given NF 130 needs to be connected to a UPF with a given (e.g., a good) QoS, the UACA 150 may measure the QoS parameters evolution at the output link of the UPF, etc. However, example embodiments are not limited thereto and the UACA may gather any type of use-aware information. At S310, the UACA 150 transmits the self-aware information to the UAVC 100.

At S320, the UACA 150 receives a new configuration of a user-aware virtualization from the UAVC 100. The user-aware virtualization allows for taking into account the user needs of different NFs, which for achieving a virtualization that is not limited to a pure connectivity issue between different NFs. For example, the user-aware virtualization may allow deployment of NFs at the most convenient data servers and ensures at the same time that the quality of the NF interconnection corresponds to the current user-needs. The configuration of the user-aware virtualization will be described in more detail later with regard to FIG. 4.

At S330, the UACA 150 applies the new configuration. For example, the UACA 150 may inform the SCP 120, as the closest network configuration element, about the new user-aware virtualization configuration that is available. Alternatively, if no SCP 150 is present, the UACA 150 may communicate with a service mesh controller, data center controller or an SDN controller responsible for the configuration of the data center 110. If a given NF has an associated SCP, then the UACA 150 informs the SCP about the new routing configuration provided by the user-aware virtualization.

Once the new configuration is applied, the data center 110 may aggregate and/or multiplex traffic flows from different NFs onto jointly transported network links according to the new configuration.

Figure 4:
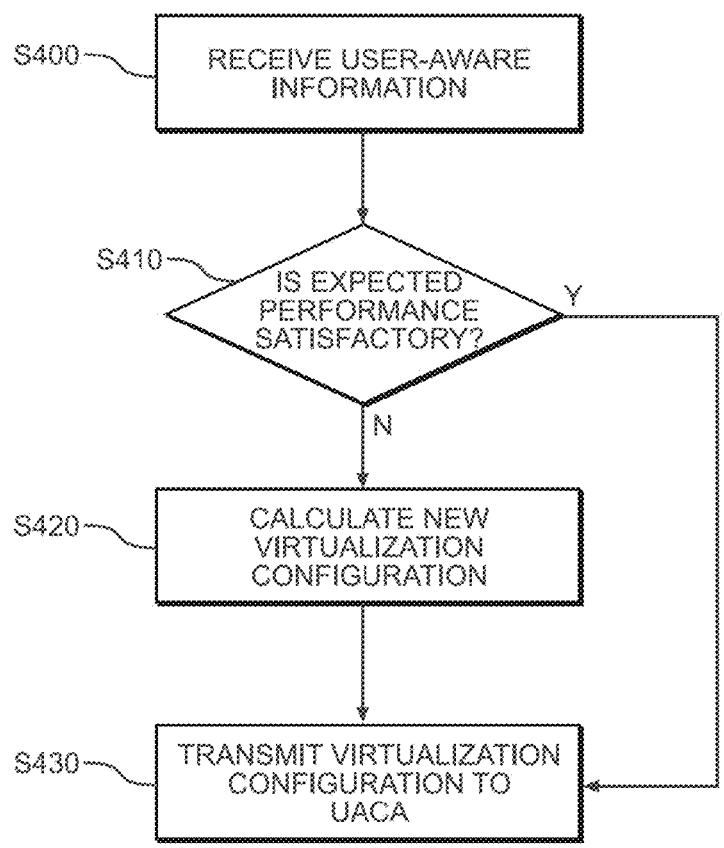
FIG. 4 is a flowchart illustrating a method according to example embodiments.

FIG. 4 is a flowchart illustrating a method according to example embodiments. The method shown in FIG. 4 may be performed at the UAVC 100.

Referring to FIG. 4, at S400 the UAVC 100 receives user-aware information for a given NF. For example, the UAVC may receive the user-aware information transmitted from the UACA 150 as described above with regard to S310.

At S410, the UAVC 100 determines, for each user included in the user-aware information, whether the expected performance of the associated NF is satisfactory. For example, the UAVC 100 may compare values included in the user-aware information with threshold values for an associated NF. For example, when user-aware information is obtained directly from the user by measuring the QoS performance parameters of the NF, (e.g., average latency of packets that are being sent), the threshold value may correspond with the maximum allowed latency for this NF.

If the UAVC 100 determines that the expected performance for all users included in the user-aware information is satisfactory (Y at S410), then the method proceeds to S430.

At S430, the UAVC 100 transmits the virtualization configuration to at least one UACA 150. An example embodiment of S430 will be described in more detail below.

Returning to S410, if the UAVC 100 determines that the expected performance for a user included in the user-aware information is not satisfactory (N at S410), then the method proceeds to S420.

At S420, for each user for which the performance of the associated NF is determined to be unsatisfactory, the UAVC 100 calculates a new network virtualization configuration. For example, the UAVC 100 may calculate a virtualization topology of micro-service connectivity for the NF. For example, the UAVC 100 may calculate the new network configuration based on the current network configuration and the received user-aware information.

Virtualizing a microservice's connectivity allows relatively seamless networking interconnectivity of NFs, especially in case of reliable (uRLLC) communications. The virtualized configuration may also be useful for cases of multicast communications for NFs, isolating tenants, providing security, etc. Virtualizing configurations allow for defining more optimal ways to allocate network and data center resources in order to satisfy user-aware needs. For instance, variable $x_l^{(d,v),r}$ accounts for the capacity allocated to transport a microservice demand (d,v) over link l on path r. Similarly, variable $u_{k,i}$ considers whether the virtualized CPU server k has been used at data center node i for supporting microservice demands.

If the NF has a micro-service connectivity database of type network repository function (NRF), the calculation is achieved by using the NF address information from NRF. The NF address information can be obtained according to known methods, for example, a service discovery procedure as disclosed by 3GPP TS 23.502 Release 16, incorporated herein by reference.

To calculate the new user-aware virtualization topology of micro-service interconnectivity, the UAVC 100 may solve a linear program (LP). For example, the UAVC 100 may optimize a linear objective function. The objective function includes minimizing total server use cost ($\Sigma_{i \in N} \Sigma_{k \in K(i)} \alpha_{server_{k,i}} u_{k,i}$) and bandwidth use cost of microservices ($\Sigma_{l \in L} \alpha_{bw_l} c_l$). For example, the objective function may be expressed as min ($\Sigma_{i \in N} \Sigma_{k \in K(i)} \alpha_{server_{k,i}} u_{k,i} + \Sigma_{l \in L} \alpha_{bw_l} c_l$).

The LP is described in Tables 1-3.

TABLE 1

| Parameter | Definition |
|---|---|
| G(N, L) | non-directed graph describing the physical network topology interconnecting servers on which microservices can be installed; here N is the set of nodes, L is the set of links |
| $T_{(d,v)}$ | traffic amplitude [Gbit/s] to be allocated to the traffic demand d of virtualization topology v, connecting a source microservice node and one or more destination microservice nodes in v |
| $U_{(d,v)}$, $Z_{(d,v)}$ | processing capacity [in %, normalized to 100% of processor capacity] to be allocated to the traffic demand d of virtualization topology v, when microservices executes at the source virtualized CPU ($U_{(d,v)}$) or destination virtualized CPU ($Z_{(d,v)}$) |
| θ | currently valid set of traffic demands of microservices (d, v) |
| V | currently valid set of virtualization topologies v |
| $\alpha_{server_{k,i}}$ | the virtualization cost of a single virtualized CPU server k at node i; set of servers k at node i is noted as K(i) |
| $\alpha_{bw_l}$ | the bandwidth use cost on the link l |
| $B_l$ | maximum bandwidth available on the link l (for achieving virtual circuit connections over this link with desired QoS requirements) |
| $P_{k,i}$ | the available processing capacity of virtualized CPU server k at node i |
| $R_{(d,v)}$ | set of pre-calculated physical routing structures $\rho_{(d, v), r}$ that can be used to carry demand d (routing structure is a path for d unicast) or a tree (d defines a multicast demand) within a single virtualization topology v (tree or not) |
| $\rho_{(d,v),r}$ | set of links used to route a demand (d, v) |

TABLE 2

| Variable | Definition |
|---|---|
| $x_l^{(d,v),r}$ | real, equal to the capacity of the currently valid microservice demand (d, v), routed over link l by using path r from $R_{(d,v)}$ |
| $u_{k,i}$ | binary: = 1, iff the virtualized CPU server k has been used at data center node i for supporting the microservice demands |
| $c_l$ | binary: = 1, iff the link l is used in the network for transporting the microservices demands |
| $p_{(d,v),r}$ | binary: = 1, iff demand (d, v) is transported over path r |

TABLE 3

| No. | Constraint |
|---|---|
| (1) | min $(\Sigma_{i\in N}\Sigma_{k\in K(i)}\alpha_{server_{k,i}}u_{k,i} + \Sigma_{l\in L}\alpha_{bw_l}c_l)$ <br> Minimizing total server use cost and bandwidth use cost of microservices. |
| (2) | $\Sigma_{r\in R_{(d,v)}}\Sigma_{l\in L, l\in \rho_{(d,v),r}} x_l^{(d,v),r} = T_{(d,v)}, \forall (d, v) \in \theta$ <br> The total allocated bandwidth to each microservice demand must be equal to the requested value. |
| (3) | $x_l^{(d,v),r} = x_{l'}^{((d,v),r)}, \forall (d, v) \in \theta, \forall r \in R_{(d,v)}, (\forall l, l' \in L)(l, l' \in r)(l \neq l')$ <br> The link continuity constraint ensuring that all the links of the same path carry the same microservice communication load. |
| (4) | $\Sigma_{k\in K(i)} P_{k,i} u_{k,i} \geq \Sigma_{1=source((d,v))}(d, v) \in \theta: U_{(d,v)} + \Sigma_{i=destination((d,v))}(d, v)\in \theta: Z_{(d,v)}, \forall i \in N$ <br> The total allocated virtualized CPU capacity must be sufficient to support the requested processing capacity of microservices. |
| (5) | $\Sigma_{(d,v)\in \theta}\Sigma_{r\in R_{(d,v)}} x_l^{(d,v),r} \leq B_l c_l, \forall l \in L$ <br> The total bandwidth capacity allocated per link cannot exceed link's capacity. |
| (6) | $\Sigma_{l\in L, l\in \rho_{(d,v),r}} x_l^{(d,v),r} \leq |L| p_{(d,v),r}, \forall (d, v) \in \theta, \forall r \in R_{(d,v)}$ <br> $\Sigma_{r\in R_{(d,v)}} p_{(d,v),r} \leq 1, \forall (d, v) \in \theta$ <br> Only a single path r can be allocated to each microservice demand (d, v). |

Calculation of the new network virtualization configuration will be described in more detail with reference to FIG. 5.

Returning to FIG. 4, at S430 the UAVC 100 transmits the virtualization configuration to at least one UACA 150. For example, the UAVC 100 may transmit the virtualization configuration to all UACAs 150 at a particular data server 100. Alternatively, the UAVC 100 may transmit the virtualization configuration to all UACAs 150 in the system 1.

For example, if the UAVC 100 calculated the new virtualization configuration (e.g., at S420), then the UAVC 100 may transmit the new virtualization configuration to the at least one UACA 150. If the UAVC 100 did not calculate the new virtualization configuration, then the UAVC 100 may transmit an unchanged virtualization configuration to the at least one UACA 150.

The virtualization configuration according to example embodiments is therefore adapted to user needs. For example, the user-aware virtualization according to example embodiments may provide for automatic reliable support of highly mobile uRLLC services (for example, ITS), taking into account the geolocalization (the user need), without needing to account for redundancy of UPF resources, during the lifetime of a uRLLC connection.

Figure 5:
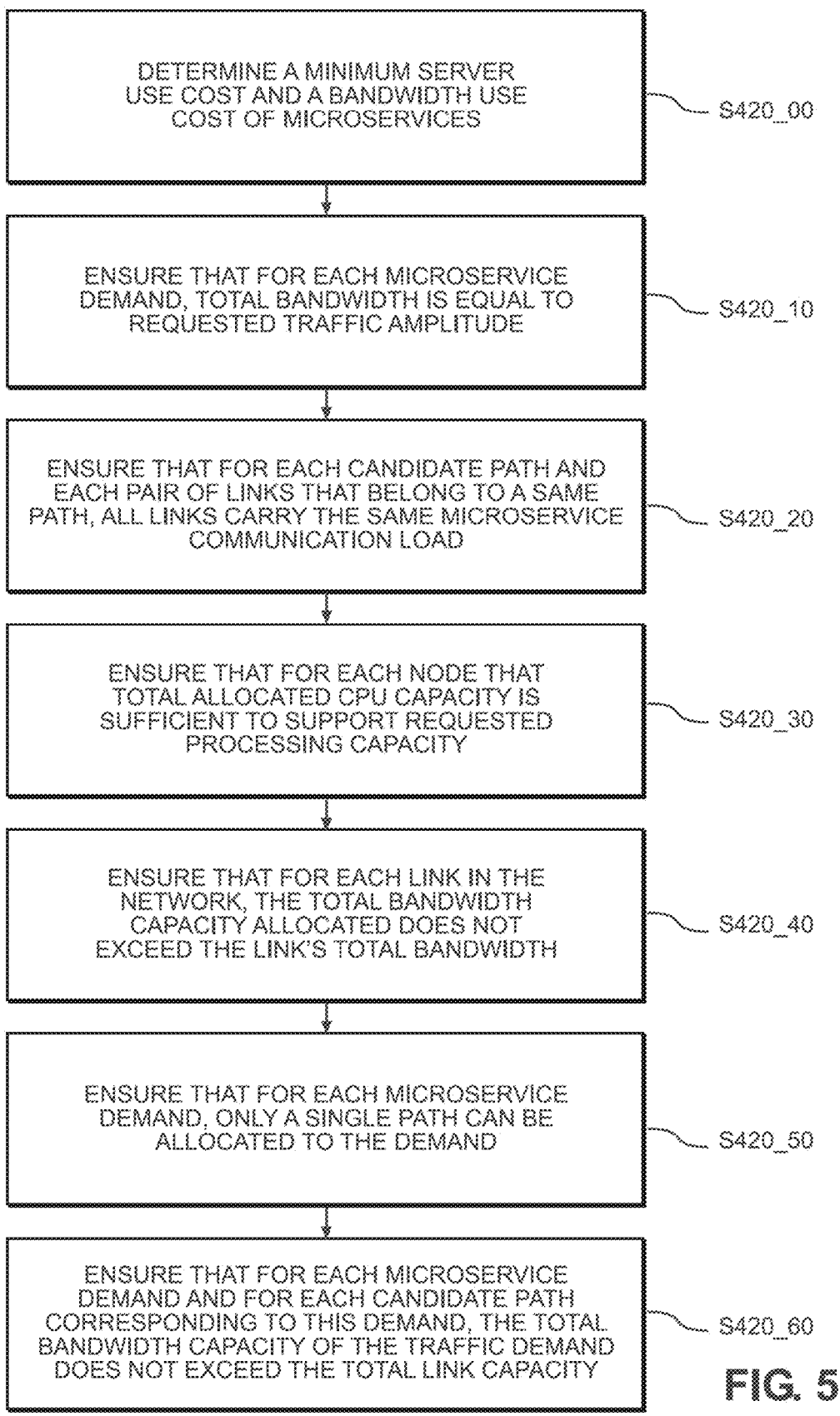
FIG. 5 is a flowchart illustrating a method according to example embodiments.

FIG. 5 is a flowchart illustrating a method according to example embodiments. The method shown in FIG. 5 may be performed at the UAVC 100. The method shown in FIG. 5 is a method for solving the LP described at S420, above. The operations are shown in FIG. 5 as occurring consecutively or serially. However, example embodiments are not limited thereto. For example, the operations of FIG. 5 may be performed in parallel, concurrently and/or simultaneously to solve the linear program described in Tables 1-3.

Referring to FIG. 5, at S 420_00 the UAVC 100 determines a minimum total server use cost ($\Sigma_{i\in N} \Sigma_{k\in K(i)} \alpha_{server_{k,i}} u_{k,i}$) and bandwidth use cost of microservices ($\Sigma_{l\in L} \alpha_{bw_l} c_l$). For example, the UAVC 100 may solve the objective function expressed as min($\Sigma_{i\in N} \Sigma_{k\in K(i)} \alpha_{server_{k,i}} u_{k,i} + \Sigma_{l\in L} \alpha_{bw_l} c_l$).

At S420_10, the UAVC 100 calculates the virtualization configuration such that for each microservice demand ((d, v)∈ θ), the total bandwidth that is allocated to this microservice demand ($\Sigma_{r\in R_{(d,v)}} \Sigma_{l\in L, l\in \rho_{(d,v),r}} x_l^{(d,v),r}$) is equal to the requested traffic amplitude for this demand ($T_{(d,v)}$).

At S420_20, the UAVC 100 calculates the virtualization configuration such that, for each microservice demand ((d, v)∈ θ), for each candidate path corresponding to this demand (r∈ $R_{(d,v)}$), and for each pair of links that belong to the same path (($\forall l, l' \in L$)(l, l'∈ r)(l≠l')), all links on the same path carry the same microservice communication load (which is equivalent to $x_l^{(d,v),r} = x_{l'}^{((d,v),r)}$).

At S420_30, the UAVC 100 calculates the virtualization configuration such that for each node (i∈ N), the total allocated virtualized CPU capacity ($\Sigma_{k\in K(i)} P_{k,i} u_{k,i}$) is sufficient (i.e. equal to or greater than the requested processing capacity of microservices). to support the requested processing capacity of microservices $$\left(\sum_{i = source((d, v))}^{(d, v) \in \theta:} U(d, v) + \sum_{i = destination((d, v))}^{(d, v) \in \theta:} Z_{(d,v)}\right)$$

deployed at this node.

At S420_40, the UAVC 100 calculates the virtualization configuration such that for each link in the network (l∈ L), the total bandwidth capacity allocated on this link ($\Sigma_{(d,v)\in \theta} \Sigma_{r\in R_{(d,v)}} x_l^{(d,v),r}$) does not exceed the link's total capacity ($B_l c_l$).

At S420_50, the UAVC 100 calculates the virtualization configuration such that for each microservice demand ((d, v)∈ θ), only a single path r can be allocated to this demand. The sum of all path selection variables ($\Sigma_{r\in R_{(d,v)}} p_{(d,v),r}$) is strictly less or equal to 1.

At S420_60, the UAVC 100 calculates the virtualization configuration such that for each microservice demand ((d, v)∈ θ) and for each candidate path corresponding to this demand (r∈ $R_{(d,v)}$), the total bandwidth capacity of the traffic demand routed over this path ($\Sigma_{l\in L, l\in \rho_{(d,v),r}} x_l^{(d,v),r}$) does not exceed (i.e. must be strictly less than or equal to) the total link capacity of this path ($|L| p_{(d,v),r}$).

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing user equipment, base stations, eNBs, RRHs, gNBs, femto base stations, network controllers, computers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently, simultaneously, or in a different order from what is shown. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, user equipment, base stations, eNBs, RRHs, gNBs, femto base stations, network controllers, computers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUS, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A method comprising:
receiving user-aware information;
calculating a network configuration for a plurality of network functions based on the user-aware information, the calculating the network configuration including optimizing an objective function including a minimum total server use cost and a bandwidth use cost of microservices of the plurality of network functions; and
transmitting the network configuration to at least one connectivity agent.

2. The method of claim 1, wherein the optimizing the objective function includes optimizing the objective function such that for each microservice demand, of a plurality of microservice demands, a total bandwidth allocated to the respective microservice demand is equal to a requested traffic amplitude for the respective microservice demand.

3. The method of claim 1, wherein the optimizing the objective function includes optimizing the objective function such that for each microservice demand, of a plurality of microservice demands, for each candidate path corresponding to a respective microservice demand, and for each pair of links of a plurality of pairs of links belonging to a same path, all links on the same path carry a same microservice communication load.

4. The method of claim 3, wherein the same microservice communication load is based on a virtualization topology, a microservice traffic demand, a route link, and a route path.

5. The method of claim 4, wherein the same microservice communication load is equivalent to $x_l^{(d,v),r} = x_l'^{((d,v),r)}$ where d is the microservice traffic demand, v is the virtualization topology, r is the route path, and l is the route link.

6. The method of claim 1, wherein the optimizing the objective function includes optimizing the objective function such that for each node, of a plurality of nodes, a total allocated CPU capacity is greater than or equal to a requested processing capacity of microservices at the respective node.

7. The method of claim 1, wherein the optimizing the objective function includes optimizing the objective function such that for each link in the network, of a plurality of links in the network, a total bandwidth capacity does not exceed a total capacity of the respective link.

8. The method of claim 1, wherein the optimizing the objective function includes optimizing the objective function such that for each microservice demand, of a plurality of microservice demands, only a single path is allocated to each respective microservice demand.

9. The method of claim 8, wherein a sum of all path selection variables is less than or equal to 1.

10. The method of claim 1, wherein the optimizing the objective function includes optimizing the objective function such that for each microservice demand, of a plurality of microservice demands, and for each candidate path corresponding to a respective microservice demand, a total bandwidth capacity of a traffic demand over the respective candidate path does not exceed a total link capacity of the respective candidate path.

11. The method of claim 1, wherein the user-aware information includes a specific requirement for network function-to-network function communications of a user equipment.

12. An apparatus comprising:
at least one processor; and
at least one memory storing instructions that, when executed by the at least one processor, cause the apparatus to
receive user-aware information,
calculate a network configuration for a plurality of network functions based on the user-aware information, by optimizing an objective function including a minimum total server use cost and a bandwidth use cost of microservices of the plurality of network functions, and
transmit the network configuration to at least one connectivity agent.

13. The apparatus of claim 12, wherein the at least one processor is further configured to cause the apparatus to optimize the objective function such that for each microservice demand of a plurality of microservice demands, a total bandwidth allocated to the respective microservice demand is equal to a requested traffic amplitude for the respective microservice demand.

14. The apparatus of claim 12, wherein the at least one processor is further configured to cause the apparatus to optimize the objective function such that for each microservice demand of a plurality of microservice demands, for each candidate path corresponding to a respective microservice demand, and for each pair of links of a plurality of pairs of links belonging to a same path, all links on the same path carry a same microservice communication load.

15. The apparatus of claim 13, wherein the at least one processor is further configured to cause the apparatus to optimize the objective function such that for each node of a plurality of nodes, a total allocated CPU capacity is greater than or equal to a requested processing capacity of microservices at the respective node.

16. The apparatus of claim 13, wherein the at least one processor is further configured to cause the apparatus to optimize the objective function such that for each link in the network, of a plurality of links in the network, a total bandwidth capacity does not exceed a total capacity of the respective link.

17. The apparatus of claim 12, wherein the at least one processor is further configured to cause the apparatus to optimize the objective function such that for each microservice demand of a plurality of microservice demands only a single path is allocated to each respective microservice demand.

18. The apparatus of claim 13, wherein the at least one processor is further configured to cause the apparatus to optimize the objective function such that for each microservice demand of a plurality of microservice demands and for each candidate path corresponding to a respective microservice demand, a total bandwidth capacity of a traffic demand over the respective candidate path does not exceed a total link capacity of the respective candidate path.

19. A method comprising:
gathering user-aware information of a plurality of user equipments;
transmitting the user-aware information to a controller;

receiving a network configuration of a plurality of network functions from the controller, the network configuration based on the user-aware information and optimization of an objective function including a minimum total server use cost and a bandwidth use cost of microservices of the plurality of network functions; and
configuring a network based on the network configuration.

\* \* \* \* \*